United States Patent [19]
Aranguren et al.

[11] 3,723,742
[45] Mar. 27, 1973

[54] RADIOISOTOPE CAPSULE PROTECTION STRUCTURE

[75] Inventors: Jorge Aranguren, Playa Del Rey, Tex.; John C. Stansel, Palos Verdes, Calif.

[73] Assignee: TRW Inc., Redondo Beach, Calif.

[22] Filed: Apr. 11, 1968

[21] Appl. No.: 721,140

[52] U.S. Cl. ..................... 250/106, 176/67, 250/108
[51] Int. Cl. ............................................. G21h 1/00
[58] Field of Search ........ 250/106 S, 108; 176/66, 67

[56] References Cited

UNITED STATES PATENTS

| | | | |
|---|---|---|---|
| 2,830,190 | 4/1958 | Karp | 250/106 S |
| 3,119,933 | 1/1964 | Allen | 250/106 S |
| 3,132,998 | 5/1964 | Long et al | 250/108 X |
| 3,432,666 | 3/1969 | Nash et al | 250/108 |
| 3,442,761 | 5/1969 | Feraday | 176/67 |
| 3,466,662 | 9/1969 | Blum | 250/106 |
| 3,488,502 | 1/1970 | Dukes | 250/106 S |

*Primary Examiner*—Archie R. Borchelt
*Attorney*—Daniel T. Anderson, Donald W. Graves and William B. Leach

[57] ABSTRACT

For safety reasons and to prolong the life of a radioisotope capsule and to increase the operating temperature, a radioisotope fuel is enclosed by an inner inert member and a high strength second member and an inert outer member. A vent is provided for release of the helium generated by isotope decay to avoid high pressure within the capsule.

7 Claims, 3 Drawing Figures

Jorge Aranguren
John C. Stansel
INVENTORS

RADIOISOTOPE CAPSULE PROTECTION STRUCTURE

BACKGROUND OF THE INVENTION

This invention relates to radioisotope capsules which provide heat for heating a propellant in a rocket engine, thermoelectric power conversion devices and other systems where a heat source is necessary.

Radioisotope capsules used in rocket engines have been known in the art. An example is seen in the U.S. Patent to Martinez et al U.S. Pat. No. 3,315,471 and assigned to the assignee of this invention.

One limitation of the typical radioisotope powered thruster is the maximum temperatures to which the encapsulating materials can be subjected due to the pressure build up resulting from the generation of helium gas due to the alpha emission of the radioisotope during nuclear decay and structural limitations of materials at high temperatures. An interim solution to this problem is provided in the U. S. Patent application to Simms, Ser. No. 569,282 assigned to the assignee of this invention in which the temperature of the radioisotope capsule is maintained at a predetermined temperature while the efficiency of the expanding gas is increased by the addition of an electric heater downstream of the capsule.

Another problem involved in previous capsule designs resides in the necessity for establishing at least a minimum safety feature. For example, there may be occasions where the capsule over heats, resulting in weakened materials and high pressures sufficient to blow up the capsule. This could occur during re-entry when the capsule is exposed to high external heating rates. Finally, for safety reasons, it is necessary to provide impact resistance so that a capsule impacting the earth will not fail and release the radioisotope fuel which would obviously create a hazard.

SUMMARY OF THE INVENTION

Briefly, the invention is directed to an inner core of radioisotope fuel which is enclosed or surrounded by a first liner which is substantially inert relative to the fuel and possible external environments. This liner is surrounded by a second liner constructed from a material such as a refractory metal which provides sufficient protection to assure inner liner integrity in the event of capsule impact. This refractory metal, however, is subject to corrosion and oxidation. Accordingly, an outer inert liner or clad is provided to enclose the refractory member. Finally, a vent is provided which allows passage of helium to prevent internal pressure build up but which is impervious to the passage of radioactive fuel particles. For example, a porous ceramic material can be utilized in the vent.

DESCRIPTION OF THE PREFERRED EMBODIMENTS

Figure 1:
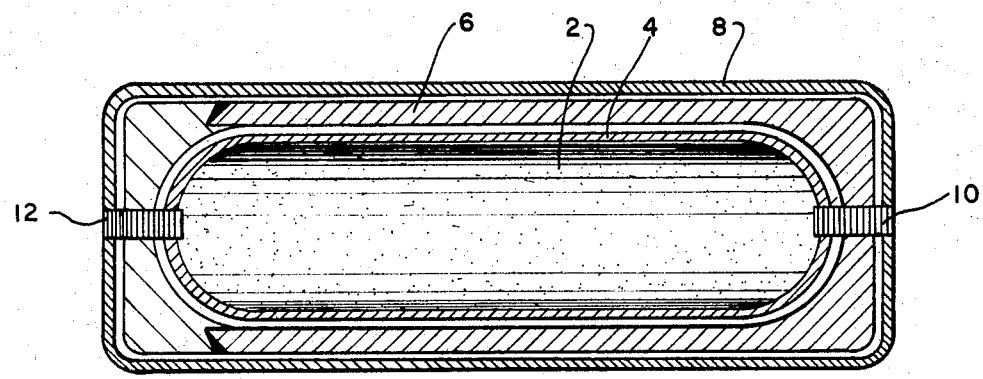
FIG. 1 is a view in cross section of one embodiment of this invention.

Referring to FIG. 1, a core 2 of radioisotope fuel is shown. As an example, this core would comprise plutonium dioxide which structurally consists of small diameter spheres in the range of 50–250 microns in diameter. This core, in turn, is surrounded by a first liner 4 which is one of the noble metals such as platinum, rhodium, and iridium and any of their intra-alloys. This metal is inert relative to the plutonium dioxide and to oxidation and corrosion. To provide structural rigidity and sufficient protection to assure inner liner integrity in the event of capsule impact, a second liner 6 is provided which in the preferred embodiment is a refractory metal such as tantalum, molybdenum, columbium, tungsten, rhenium and their alloys. Since this second liner is subject to corrosion by, for example, oxygen, an outer member 8 surrounds liner 6 to prevent such an occurrence during normal handling and operation. This outer liner 8 is likewise a noble metal or a noble metal alloy.

To prevent build up of helium pressure generated by the alpha emitting fuel, a vent 10 and/or 12 is provided to allow the escape of helium gas from core 2 to the external atmosphere. This vent can be constructed from a porous ceramic such as the oxides of aluminum, zirconium, hafnium and/or yttrium. These materials will allow the passage of helium gas but retain the small diameter spheres or particles of plutonia. Even in the event the outer liner is breached on impact and the refractory member 6 corrodes, the vented inner liner will provide for long term isotope containment required to prevent hazards.

Figure 2:
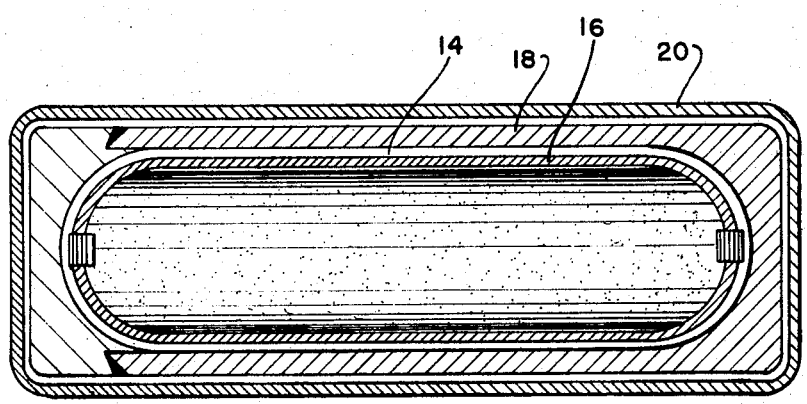
FIG. 2 is a view in cross section of another embodiment of this invention.

In FIG. 2, the construction is substantially similar to that of FIG. 1 with the exception that the helium vent (or vents) does not reach the external environment but is (or are) connected to a space 14 between inner members 16 and the second liner 18. In this design, the second liner 18 serves as both an impact protection member and a pressure vessel to contain the helium during normal operation. This configuration is advantageous since it essentially eliminates the possibility of damage to the venting device during impact, but requires the capsule to be designed as a high temperature pressure vessel during normal operation. In the event of abort, the capsule outer clad 20 might be damaged and the refractory member 18 corroded away. The vent would then release the contained helium and the inner liner would provide the long-term isotope containment required to prevent hazards.

Figure 3:
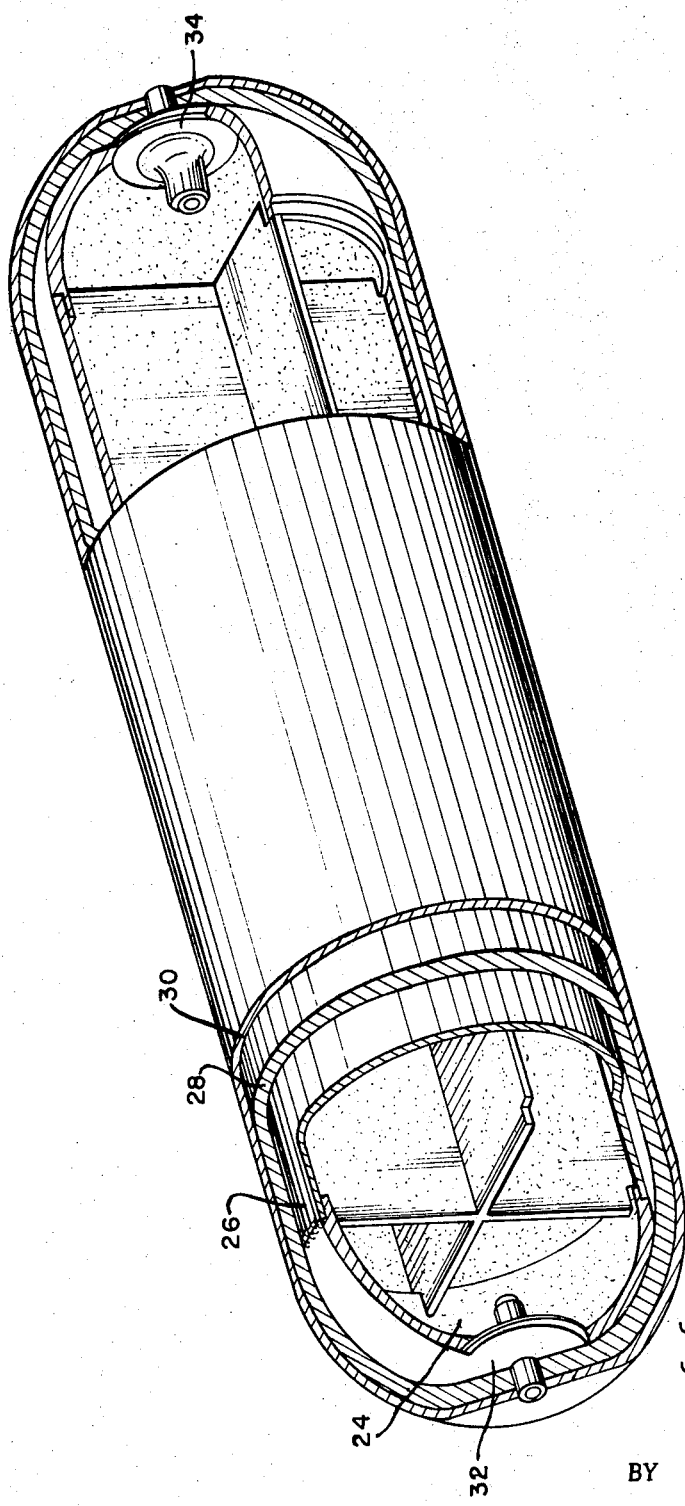
FIG. 3 is a perspective view, partially cut away, of still another embodiment of this invention.

Referring to FIG. 3, a third embodiment is illustrated, which as in previous cases, includes a radioisotope core 24, a noble metal liner 26, a refractory liner 28, and an outer noble metal member 30. The vents are shown at 32 and 34. The essential difference between this embodiment and the first embodiment shown in FIG. 1 is through the addition of heat conducting fins 36. By placing these fins, which also may be of a noble metal, in the radioisotope core, heat is conducted readily to the outside surface of the capsule. Although not shown, this capsule would normally be placed in a rocket engine such as shown in the aforementioned U. S. Pat. No. 3,315,471 with gas passed around the capsule whereby to be heated, expanded, passed through a nozzle and thus provide thrust.

Having described this invention, it is to be understood that it is to be limited only by the scope of the claims appended hereto.

What is claimed is:

1. A radioisotope heat source capsule comprising:
   an inner core containing a radioisotope fuel,
   a first noble metal liner enclosing said core, said first liner being substantially inert relative to said fuel and external corrosive environments,
   a second refractory metal liner enclosing said first liner and constructed to withstand substantial impact,
   a third noble metal liner surrounding said second liner and adapted to prevent corrosion of said second liner during normal operations, and
   a vent extending from said inner core to at least the exterior of said first liner,
   said vent being adapted to allow passage of helium generated by the radioisotope fuel decay while preventing passage of said fuel.

2. A radioisotope heat source capsule according to claim 1 wherein said vent extends through said second and third liners to the exterior of said capsule.

3. A radioisotope heat source capsule according to claim 1 wherein said vent is a porous ceramic material.

4. A radioisotope heat source capsule according to claim 3 wherein said porous ceramic material is selected from the group consisting of of aluminum oxide, zirconium oxide, hafnium oxide and yttrium oxide.

5. A radioisotope heat source capsule according to claim 1 wherein said first and third liners comprise a noble metal selected from the group consisting of platinum, rhodium, iridium and their alloys.

6. A radioisotope heat source capsule according to claim 1 wherein said second liner is a refractory metal selected from the group consisting of tantalum, molybdenum, columbium, tungsten, rhenium and their alloys.

7. A radioisotope heat source capsule according to claim 1 wherein heat conductive fins are provided in said inner core so as to conduct heat from said core to said liners.

* * * * *